Oct. 8, 1963

M. A. GLEESON 3,106,285

LONG WEARING FLEXIBLE TROUGHING IDLER ASSEMBLY
FOR FLEXIBLE BELT CONVEYORS

Filed Nov. 24, 1959

INVENTOR.
Murray A. Gleeson
BY Parker & Carter
Attorneys.

Oct. 8, 1963    M. A. GLEESON    3,106,285
LONG WEARING FLEXIBLE TROUGHING IDLER ASSEMBLY
FOR FLEXIBLE BELT CONVEYORS
Filed Nov. 24, 1959    2 Sheets-Sheet 2

INVENTOR.
Murray A. Gleeson
BY *Parker & Carter*
*Attorneys.*

3,106,285
LONG WEARING FLEXIBLE TROUGHING IDLER ASSEMBLY FOR FLEXIBLE BELT CONVEYORS

Murray A. Gleeson, Downers Grove, Ill., assignor to Goodman Manufacturing Company, Chicago, Ill., a corporation of Illinois
Filed Nov. 24, 1959, Ser. No. 855,165
2 Claims. (Cl. 198—192)

This invention relates to flexible belt conveyors in general, and particularly to a troughing idler assembly for use in such conveyors.

Flexible sideframe belt conveyors of the type illustrated in the Craggs et al., Patent No. 2,773,257, have come into widespread use in recent years due to their many inherent desirable features, including high carrying capacity, ease of installation and maintenance, and low initial cost. Since the introduction of the type of conveyor illustrated in the aforementioned patent, several variations have appeared on the market. In one of these, a plurality of hard rubber rollers of relatively short axial length are positioned at intervals along a flexible or limber roller carrying member such as a rubber coated metal cable or the like. The ends of the roller carrying member are supported in bearings or other means which permit free turning movement of the entire assembly in response to the passage of a belt across the bed formed by the rollers.

Among other problems encountered in this type of construction is the fact that the rollers often wear unevenly due to the fact that the center rollers are subjected to substantially heavier loads than the end or flanking rollers. When the rollers wear unevenly, stresses may be set up in the conveyor belt which somewhat shortens its life, and the idler assembly may acquire belt detraining characteristics.

Another problem is that of securement of the individual rollers to the roller carrying member. In the past it has been common practice to mold the rollers and the coating covering the flexible cable about the cable in the same operation. This procedure has the disadvantage, however, of precluding any commercially feasible means of replacing excessively worn rollers.

Accordingly, a primary object of this invention is to provide a rugged, extremely long life limber roller assembly in which the wear resistance of the rollers subjected to the most severe wear is increased to thereby lengthen the life of the assembly.

Another object is to provide a limber roller assembly in which worn rollers may be easily replaced.

Yet another further object is to provide a limber roller troughing idler assembly wherein the individual rollers are locked in place by deformation of the roller carrying supporting strand to thereby eliminate the use of accessory locking devices for connecting the rollers to the strand.

Yet another object is to provide a limber roller assembly which is extremely inexpensive to manufacture and utilizes a minimum of component parts.

Other objects will become apparent to those skilled in the art from the following description and claims.

The invention is illustrated more or less diagrammatically in the accompanying drawings, wherein.

Like reference numerals will be used to refer to like parts throughout the following description of the drawings.

Figure 1:
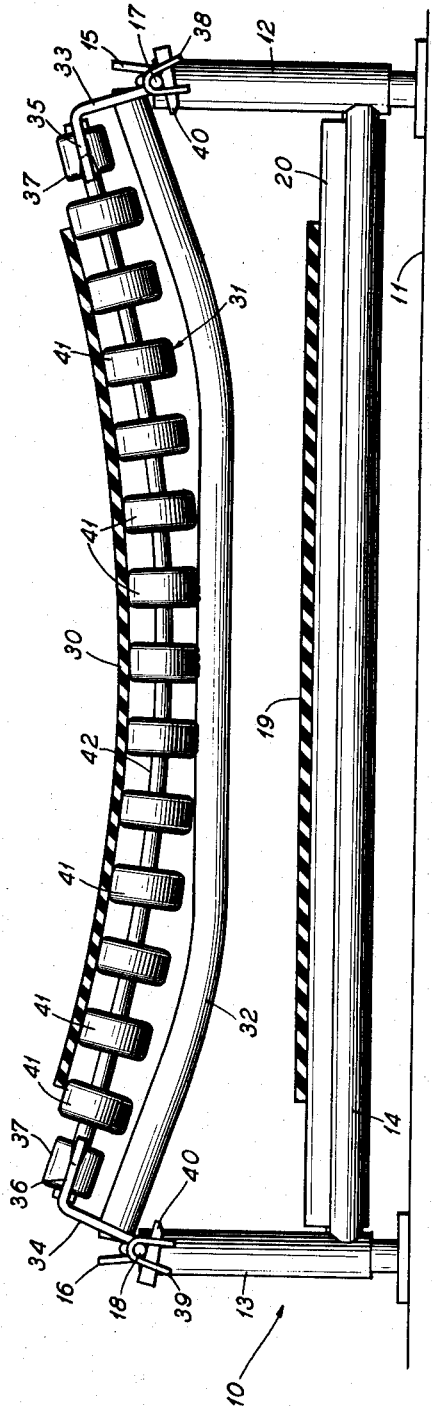
FIGURE 1 is a sectional view taken through a flexible strand conveyor illustrating the troughing idler assembly of the present invention in elevation.

In FIGURE 1, a flexible strand conveyor is illustrated generally at 10 resting on a mine floor 11. The conveyor includes a pair of telescopic, vertically adjustable support stands 12 and 13 which are maintained a fixed distance apart by a brace or strut 14. A pair of U-shaped saddle members 15 and 16 welded or otherwise suitably secured to the top of the telescopic support stands form seats which receive the flexible strands 17 and 18. The return reach 19 of a flexible conveyor belt is supported by a return roller 20 supported from the stands or cross strut 14 by any suitable supporting means, not shown. Since the details of the basic supporting structure are not essential to a further understanding of the invention, they will not be further described.

The conveying reach 30 of a flexible conveyor belt is supported by a limber roller troughing idler assembly indicated generally at 31. When installed in a coal mine, for example, the conveyor will consist of a plurality of these troughing idler assemblies located at intervals along the flexible strands 17 and 18. For purposes of illustration only one is shown since this showing is sufficient to adequately illustrate the invention.

In the illustrated embodiment, the troughing idler assembly is supported by a substantially rigid frame structure including a main frame member 32, which is slightly dished or concave to follow the contour of the conveyor belt, and end connecting members 33 and 34. The upper ends of the connecting members 33, 34 are inwardly directed as at 35, 36 to receive bearings indicated generally at 37 which will later be described in detail. The lower ends of the brackets 33, 34 are welded to inverted U-shaped hangers 38, 39 which connect the assembly to the strands. Wedges or drift pins 40 force the strands into snug engagement with the seats in the inverted brackets. Although the roller assembly is shown supported by a substantially rigid frame, it will be obvious to one skilled in the art that the assembly could be connected directly to the flexible strands 17 and 18 within the scope of the invention.

Figure 2:
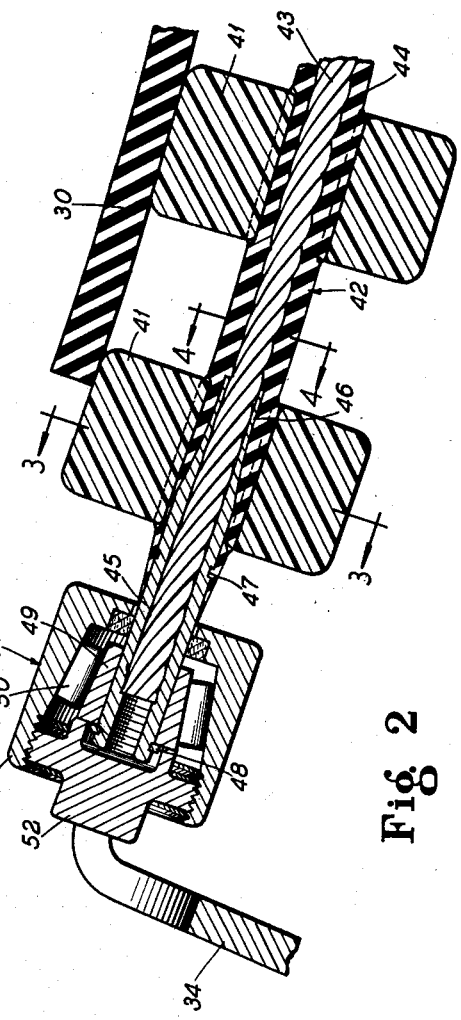
FIGURE 2 is a partial sectional view of one end of the limber roller troughing idler assembly of FIGURE 1.

In FIGURE 2, the construction of the roller assembly and its manner of connection to the frame member is illustrated in detail. The assembly consists of a plurality of rollers 41 secured to a roller carrying member, indicated generally at 42. In this instance, the roller carrying member 42 is a length of wire or nylon cable 43 encased in a resilient elastomer 44, such as rubber or neoprene which has been molded about the cable. The left end of cable 43 is received in a connecting sleeve 45 whose right or inner end is tapered as at 46. The elastomer is likewise formed about the connecting sleeve. Notches 47 prevent longitudinal slippage of the elastomer along the sleeve. The left end of connecting sleeve 45 is necked down to receive a holding washer 48 which bears against the inner race 49 of roller bearing 37. A plurality of rollers 50 disposed between the inner race 49 and the outer race 51 permit the roller carrying member 42 and the rollers 41 supported thereon to rotate freely. End plug 52, which is threadably received in the outer race 51 of bearing 37, forces the races into snug engagement.

Figure 3:
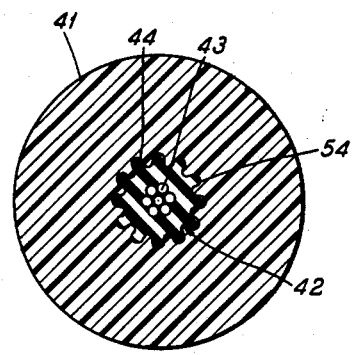
FIGURE 3 is a view taken substantially along the line 3—3 of FIGURE 2.
Figure 4:
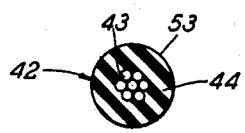
FIGURE 4 is a view taken substantially along the line 4—4 of FIGURE 2.
Figure 5:
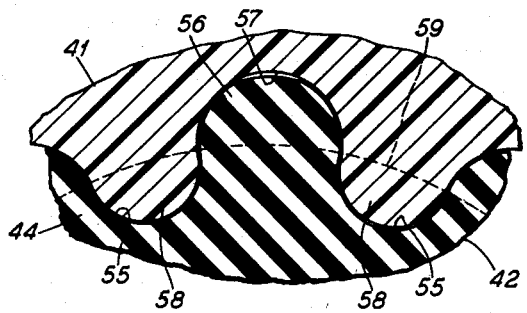
FIGURE 5 is a detailed sectional view of the connection between the rollers and the roller supporting member.

The mode of connecting the rollers 41 to roller carrying member 42 is illustrated best in FIGURES 2 through 6. Roller carrying member or strand 42 includes alternate portions of varying diameters. Thus, hub portions 53 are of somewhat smaller diameter than splined portions 54. The alternate indentations 55 and projections 56 of the splined portions mesh with corresponding complementary indentations 57 and projections 58 formed around the internal periphery of rollers 41. FIGURE 3 illustrates the relative positioning of the splined portion 54 of the composite strand and the rollers 41. In FIGURE 5, the connection between the roller and strand is seen to be in effect a series of intermeshing teeth formed on the exterior of the composite strand 42 and the interior of rollers 41. In FIGURE 5, the pitch diameter of the teeth on strand 42 is indicated generally at 59, whereas the crest and root diameters of the composite strand would lie on a tangent to those areas. There is a snug fit between the intermeshing teeth, and little or no compression of the resilient material 44 occurs.

In FIGURE 4, an intermediate or hub portion 53 between adjacent splined portions of the composite strand 42 is shown in cross section. The diameter of the hub portion is between the root and crest diameters of the splines and teeth on strand 42, and may conveniently coincide with the pitch circle 59.

Figure 6:
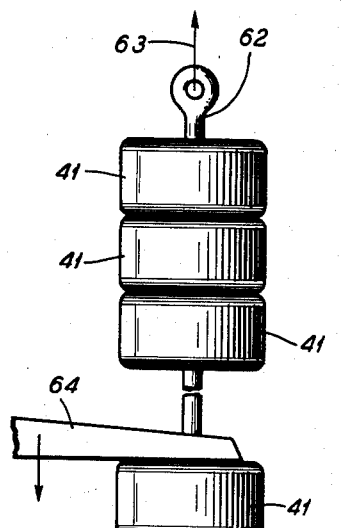
FIGURE 6 is a diagrammatic view illustrating the manner of assembling the individual rollers on the flexible core or roller supporting member.
Figure 6:
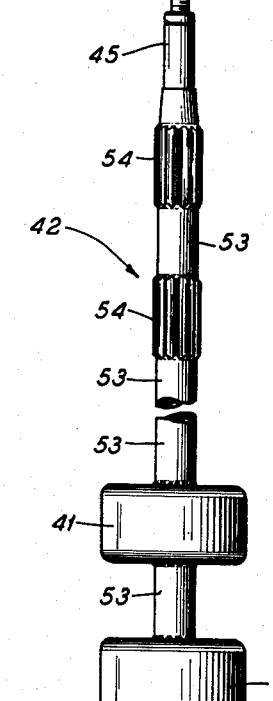
Figure 6:
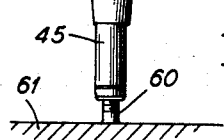

The use and operation of the invention is as follows:

In order to promote long-wearing life of the rollers in a limber roller troughing idler assembly, it is convenient to form the rollers from a hard wear-resistant material such as ceramic, plastic, or glass. Rollers of these materials are indicated generally at 41. It is not practical, however, to form the roller carrying member 42 of such materials, since the assembly must be free to flex and change its contour in response to varying load conditions on the belt. The mode of securing the hard rollers to the flexible composite strand is illustrated in FIGURE 6.

In this figure, left connector sleeve 45 has been threaded onto bolt 60 anchored in support 61. An elongated bolt 62 is threaded into the right sleeve 45 and the strand member 42 is put under tension by a force exerted in the direction of the arrow 63. A plurality of rollers 41 supported on bolt 62 are pushed into position by a suitable tool 64 which slides the rollers into alignment with the splined portions 54 of strand 42. Since the diameter of hub portions 53 is slightly larger than the crest diameter of the teeth or projections on the central aperture in rollers 41, those portions of the hub in line with the roller teeth (or conversely the spline indentations) will be deformed as the roller slides thereacross into position overlying the splines. In the illustrated embodiment, the rollers are slid from one end of the strand to the other. It will be understood, however, that in some instances it may be convenient to slide the rollers only half way along the strand from each end, thus minimizing the wear on the hub portion adjacent the ends of the strand from which the rollers are fed.

As soon as a roller moves past a hub portion 53 in its travel to a position overlying a splined portion 54, the inherent resiliency of the elastomer will restore the hub portion to its former condition. Slippage of the rollers along the roller carrying member 42 is prevented by the abutments formed at the junction between hub portions 53 and the disc faces of the roller projections, or crests. If the hub diameter is equal to the pitch diameter 59, for example, that portion of the hub lying below the pitch circle and in line with the roller crest effectively holds the roller in place on the spline.

Although a preferred embodiment of the invention has been illustrated and described, it will be apparent that there are other variations possible within the skill of one versed in the art. Accordingly, the scope of this invention should not be limited except by the scope of the following claims.

I claim:
1. A troughing roller assembly for use in flexible belt conveyors,
    said assembly having quickly and easily replaceable rollers and including, in combination,
    an elongated, flexible roller carrying member,
    said member comprising a metallic core having a substantially constant external diameter from end to end,
    a surface covering extending the entire roller supporting length of the core,
    said surface covering being in snug frictional engagement with the core and having a constant internal diameter over substantially the entire roller supporting length of the core,
    said surface covering being composed of a material having the general characteristics as to flexure and compressibility of rubber,
    said surface covering being unbroken over substantially the entire roller supporting length of the core,
    a plurality of replaceable, generally centrally apertured, substantially uniform diameter and uniform length rollers spaced along the roller supporting length of the elongated member to thereby support a flexible conveyor belt,
    at least those rollers near the middle of the assembly being composed of a hard, plastic wear resistant material and
    means for securing the replaceable rollers directly to, and in direct abutting engagement with, the covered elongated member for rotation therewith,
    said means including a plurality of splines having mating projections and indentations formed in the abutting surfaces of the generally centrally located apertures in the rollers and the roller-contacting periphery of the surface covering whereby the rollers may be easily slid over the covered metallic core for replacement and inspection, and reinstallation.

2. The replaceable troughing roller assembly of claim 1 further characterized in that one end of the elongated generally flexible roller carrying member has means for securing said elongated member to a fixed support and,
    the other end has means for receiving a roller storage assembly, whereby, when said elongated member is connected to said roller storage, individual rollers may be slid from the roller storage assembly onto the elongated member.

References Cited in the file of this patent
UNITED STATES PATENTS

| | | |
|---|---|---|
| 1,804,701 | Mojonnier | May 12, 1931 |
| 1,833,179 | Robins | Nov. 24, 1931 |
| 2,837,202 | Baechli | June 3, 1958 |
| 2,851,151 | McCallum | Sept. 9, 1958 |

FOREIGN PATENTS

| | | |
|---|---|---|
| 210,127 | Australia | Feb. 28, 1957 |
| 1,177,564 | France | Dec. 1, 1958 |
| 808,019 | Great Britain | Jan. 28, 1959 |

OTHER REFERENCES

"Mechanical Engineers' Handbook," by Lionel S. Marks, 5th Ed., 1951, pages 892–893.